(12) United States Patent
Jay et al.

(10) Patent No.: US 9,933,289 B2
(45) Date of Patent: Apr. 3, 2018

(54) ORIFICE PLATE ASSEMBLY

(71) Applicant: DANIEL MEASUREMENT AND CONTROL, INC., Houston, TX (US)

(72) Inventors: Gregory Theron Jay, Houston, TX (US); Justin Blake Crouch, Houston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 0 days.

(21) Appl. No.: 14/824,246

(22) Filed: Aug. 12, 2015

(65) Prior Publication Data

US 2017/0045385 A1 Feb. 16, 2017

(51) Int. Cl.
*G01F 1/42* (2006.01)

(52) U.S. Cl.
CPC .................... *G01F 1/42* (2013.01)

(58) Field of Classification Search
CPC ..... G01F 1/37; G01F 1/42; G01F 1/34; G01F 1/46
USPC ............... 73/861.52, 861.61, 861.42, 861.65
See application file for complete search history.

(56) References Cited

U.S. PATENT DOCUMENTS

| 5,085,250 | A | * | 2/1992 | Kendrick | ................ G01F 15/00 138/40 |
| 5,305,796 | A | * | 4/1994 | Klak | ........................ G01F 1/42 138/40 |
| 7,461,563 | B1 | * | 12/2008 | Peng | ........................ G01F 1/42 73/861.52 |

* cited by examiner

*Primary Examiner* — Jewel V Thompson
(74) *Attorney, Agent, or Firm* — Conley Rose, P.C.

(57) ABSTRACT

An orifice plate assembly including a plurality of ring members, each having an inner facing surface including a first annular recess extending therein, and a plurality of inner annular seals, wherein a different inner annular seal of the plurality is overmolded to the first annular recess of each of the plurality of ring members to seal against a facing surface of an orifice plate captured between the plurality of ring members.

20 Claims, 10 Drawing Sheets

ORIFICE PLATE ASSEMBLY

BACKGROUND

Fluid flow rate is the quantification of bulk fluid or gas movement, typically measured as volumetric and mass flow rates. The ability to measure reliably and accurately fluid flow rates serves an important function in a variety of processes and industries (e.g., chemical processing, oil and gas transport and production, etc.). An orifice fitting is one of many devices that may be used to measure volumetric or mass flow rate of fluids flowing through a pipe or conduit. An orifice fitting typically employs a flat, thin plate having a central orifice that is smaller in diameter than the diameter of the conduit in which the plate is disposed. The orifice plate is positioned between a sealing ring and a compression ring that may be held together by a fastener to form an orifice plate assembly. The orifice plate assembly is disposed within a plate carrier, which is, in turn, supported and aligned within the orifice fitting. In this arrangement, the mass fluid flow rate through the conduit may be calculated from the pressure differential measured across the orifice plate, as well as other parameters.

When using an orifice fitting to measure fluid flow, many factors must be considered in order to obtain accurate flow estimates. Typically, the orifice plate assembly is positioned within the orifice fitting with the seal and compression rings positioned on the upstream and downstream sides, respectively, of the orifice plate. A seal is provided between the seal ring and orifice plate, but no seal is provided between the orifice plate and the compression ring. With these unidirectional orifice plate assemblies, leakage may occur if the compression ring side of the orifice plate assembly is inadvertently positioned upstream. Leakage results in reduced pressure drop across the orifice plate and inaccurate estimations of fluid flow through the fitting.

BRIEF SUMMARY OF THE DISCLOSURE

An embodiment of an orifice plate assembly comprises a plurality of ring members, each having an inner facing surface comprising a first annular recess extending therein, and a plurality of inner annular seals, wherein a different inner annular seal of the plurality is overmolded to the first annular recess of each of the plurality of ring members to seal against a facing surface of an orifice plate captured between the plurality of ring members. In an embodiment, each ring member comprises a plastic material and each inner annular seal comprises an elastomeric material. In an embodiment, each ring member comprises an outer facing surface having a second annular recess extending therein, and an outer annular seal overmolded to the second annular recess. In this embodiment, each ring member comprises a plurality of circumferentially spaced ports extending between the first annular recess and the second annular recess. In this embodiment, the orifice plate assembly further comprises an elastomeric element disposed in each port coupling the inner annular seal to the outer annular seal. In an embodiment, the inner annular seal, outer annular seal, and each elastomeric element disposed in each port of each ring member is overmolded to a ring member. In an embodiment, the first annular recess of each ring member comprises a pair of opposing annular shoulders for compressing the inner annular seal against a facing surface of the orifice plate captured between the plurality of ring members. In this embodiment, coupling a first of the plurality of ring members to a second of the plurality of ring members with an orifice plate disposed therebetween compresses the inner annular seal of the ring members against facing surfaces of the orifice plate.

An embodiment of an orifice plate assembly comprises a plurality of ring members, each including an outer facing surface and an inner facing surface, wherein the outer facing surface comprises a first annular recess extending therein, the inner facing surface comprises a second annular recess extending therein, and each of the ring members comprises a plurality of ports extending between the first annular recess and the second annular recess, and a plurality of seal rings, each of the plurality being molded to one of the plurality of ring members, wherein each seal ring comprises an inner annular seal to seal against a facing surface of an orifice plate captured between the plurality of ring members. In an embodiment, each seal ring is overmolded to each ring member. In an embodiment, each ring member comprises a plastic material and each seal ring comprises an elastomeric material. In this embodiment, the seal ring comprises an outer annular seal disposed in the second annular recess of each ring member. In this embodiment, each seal ring comprises an elastomeric element extending through a port of each ring member. In an embodiment, the first annular recess of each ring member comprises a pair of opposing annular shoulders for compressing the inner annular seal against a facing surface of the orifice plate captured between the plurality of ring members. In an embodiment, coupling a first of the plurality of ring members to a second of the plurality of ring members with an orifice plate disposed therebetween compresses the inner annular seal of the ring members against facing surfaces of the orifice plate.

An embodiment of an orifice fitting comprises a tubular body having a through passage, and an orifice plate assembly removably disposed within the tubular body across the through passage, the orifice plate assembly comprising an orifice plate disposed between a pair of ring members, wherein each ring member comprises an inner facing surface comprising a first annular recess extending therein, and wherein each ring member comprises an inner annular seal overmolded to the first annular recess of the ring member to seal against a facing surface of the orifice plate. In an embodiment, each ring member comprises an outer facing surface having a second annular recess extending therein, and an outer annular seal overmolded to the second annular recess. In an embodiment, each ring member comprises a plurality of circumferentially spaced ports extending between the first annular recess and the second annular recess. In this embodiment, the orifice fitting further comprises an elastomeric element disposed in each port coupling the inner annular seal to the outer annular seal. In this embodiment, each ring member comprises an outer annular seal, and wherein a distance between the outer annular seals of the orifice plate assembly is greater than the distance between a pair of annular seat faces of the tubular body.

The foregoing has outlined rather broadly features of disclosed embodiments in order that the detailed description that follows may be better understood. Additional features will be described hereinafter that form the subject of certain of the claims.

BRIEF DESCRIPTION OF THE DRAWINGS

For a detailed description of the various exemplary embodiments disclosed herein, reference will now be made to the accompanying drawings in which.

DETAILED DESCRIPTION OF EXEMPLARY EMBODIMENTS

Figure 1:
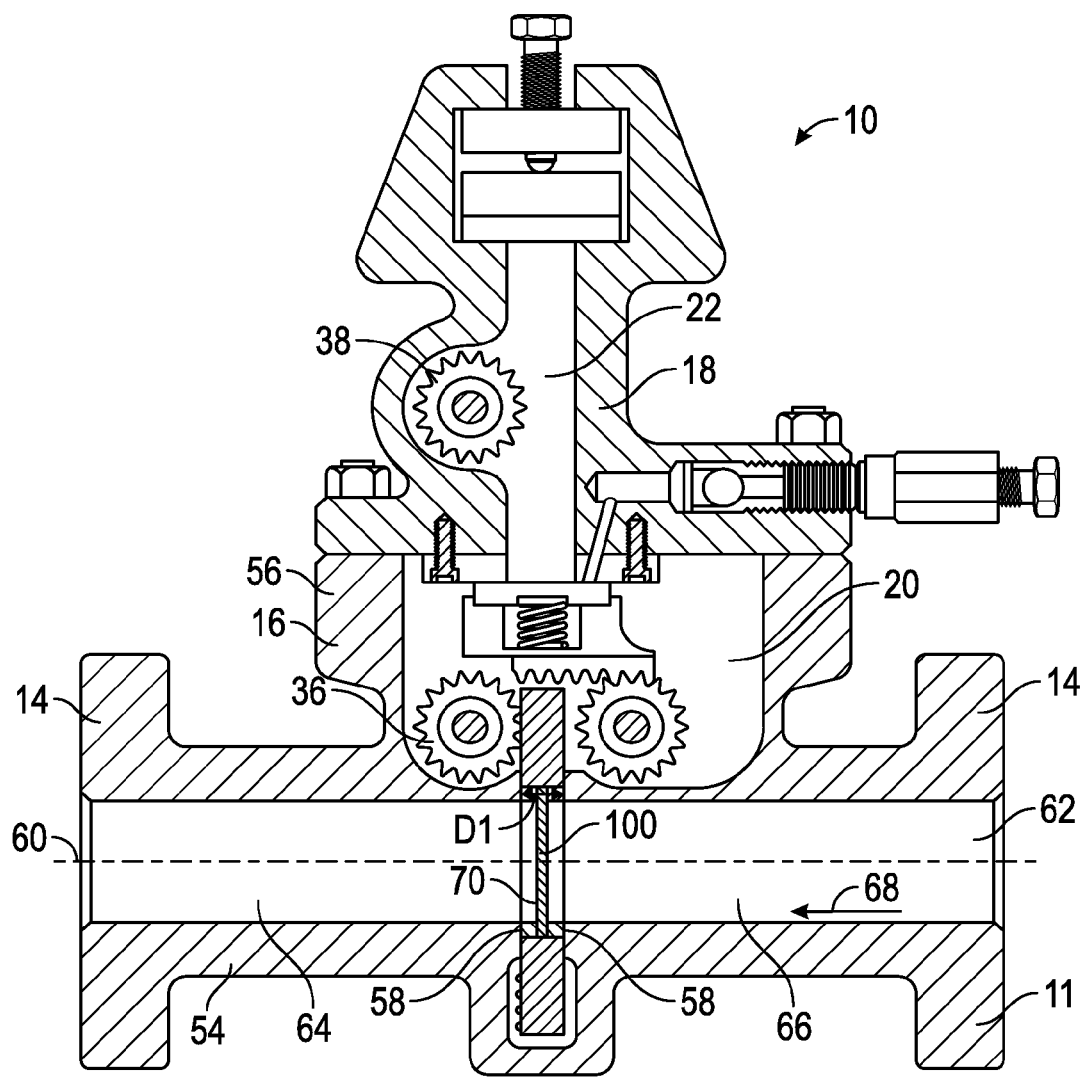
FIG. 1 illustrates a cross-sectional view of an orifice fitting having an orifice plate assembly in accordance with principles described herein.

The following discussion is directed to various embodiments of the invention. One skilled in the art will understand that the following description has broad application, and the discussion of any embodiment is meant only to be exemplary of that embodiment, and not intended to intimate that the scope of the disclosure, including the claims, is limited to that embodiment.

The drawing figures are not necessarily to scale. Certain features of the invention may be shown exaggerated in scale or in somewhat schematic form, and some details of conventional elements may not be shown, all in the interest of clarity and conciseness. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

FIG. 1 illustrates a cross-sectional view of an orifice fitting with an orifice plate assembly captured in an orifice plate carrier in accordance with the principles disclosed herein. An orifice fitting is a type of meter that determines flow rates by measuring the pressure differential across a particularly-sized orifice. In this embodiment, orifice fitting 10 includes a body 11 having a lower portion 16 coupled to an upper portion 18. Lower portion 16 includes a conduit or tubular member 54 having a flange 14 disposed at both ends and a housing 56 disposed therebetween. Flanges 14 of tubular member 54 couple orifice fitting 10 between sections of a fluid-carrying pipeline (not shown). Tubular member 54 also includes an axial flowbore 62 extending therethrough, characterized by a central axis 60 and upstream and downstream regions 66, 64, respectively. A fluid may flow through flowbore 62 from upstream region 66 to downstream region 64 generally in the direction indicated by arrow 68. Housing 56 encloses a lower chamber 20 with a lower drive 36, having a gear shaft and pinions disposed therein. Upper portion 18 of orifice fitting 10 encloses an upper chamber 22 with an upper drive 38, also having a gear shaft and pinions disposed therein.

An orifice plate carrier 70 capturing an embodiment of an orifice plate assembly 100 may be raised and lowered within orifice fitting 10 by operating lower drive 36 and upper drive 38. In this illustration, plate carrier 70 is fully inserted into orifice fitting 10. When plate carrier 70 is fully inserted into orifice fitting 10 as shown in FIG. 1, orifice plate assembly 100 is disposed between a pair of axially spaced annular seat faces 58 of tubular member 54. An axially extending gap having a distance D1 is formed between the pair of seat faces 58. As will be described further herein, orifice plate assembly 100 is configured to seal against seat faces 58 of tubular member 54 to restrict fluid communication between lower chamber 20 and flowbore 62. Also as will be described further herein, orifice plate assembly 100 includes an orifice plate having a centrally disposed aperture extending therethrough, allowing for fluid to flow through orifice plate assembly 100 between upstream region 66 and downstream region 64 while creating a pressure drop between regions 66, 64, respectively. Also, while in this embodiment orifice plate assembly 100 is used in orifice plate fitting 10, in other embodiments orifice plate assembly 100 may be used in other orifice fittings or other tools for creating a pressure differential in a fluid flow.

Figure 2A:
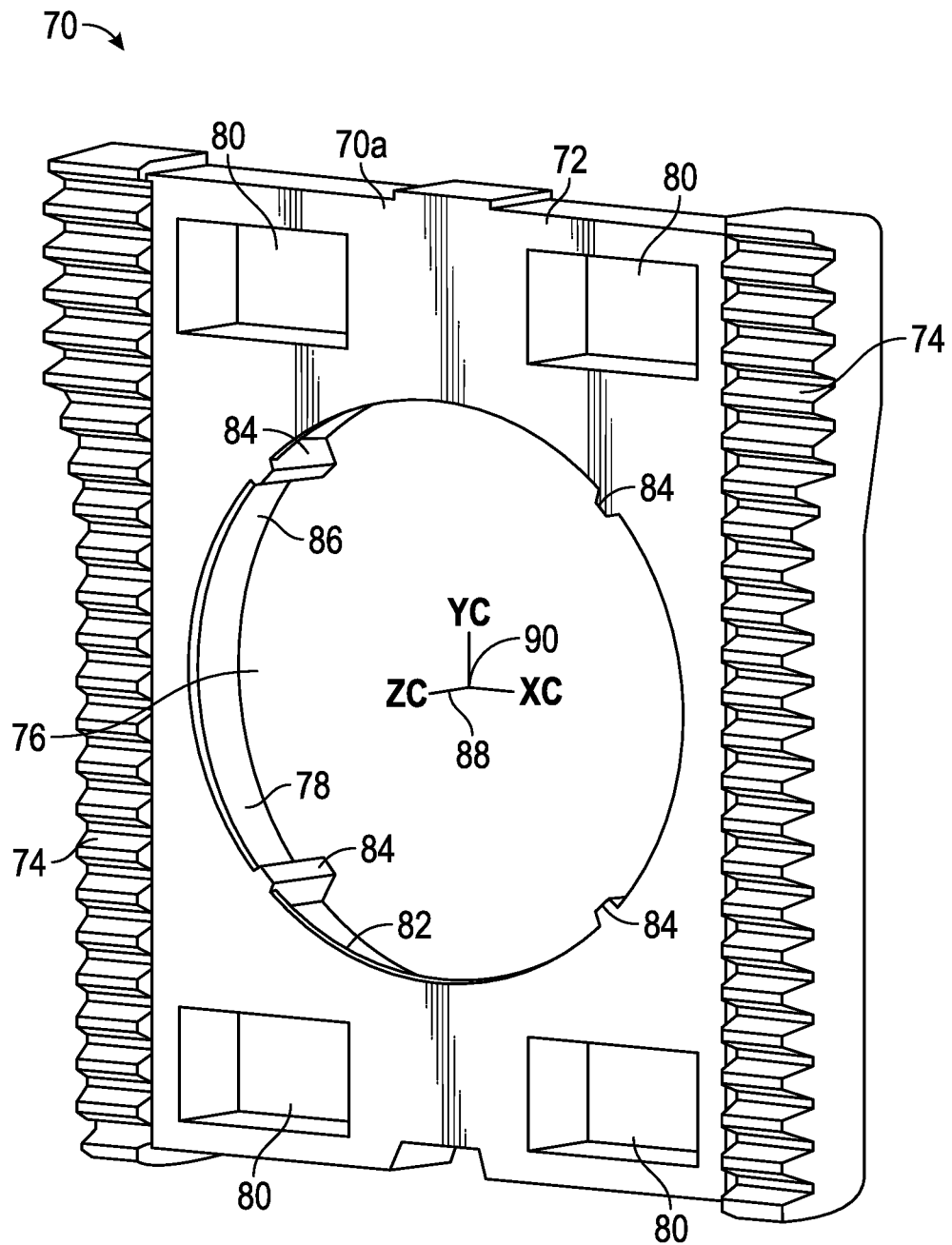
FIG. 2A is a perspective view of the downstream face of the orifice plate carrier of FIG. 1.

Referring now to FIG. 2A, which depicts a view of the downstream face 70a of plate carrier 70, or in other words, the face 70a of plate carrier 70 that is disposed adjacent downstream region 64 when plate carrier 70 is inserted into orifice fitting 10. In this embodiment, plate carrier 70 includes a rectangular body 72 having two parallel toothed racks 74 disposed along opposing lateral sides of body 72. In at least some embodiments, body 72 comprises metal, such as stainless steel. Racks 74 interface with lower drive 36 and upper drive 38 to enable the vertical displacement of plate carrier 70 within orifice fitting 10. Plate carrier 70 further includes a centrally disposed opening 76 defined by a generally cylindrical inner surface 78, and a plurality of flow ports 80, each extending through body 72.

Figure 2B:
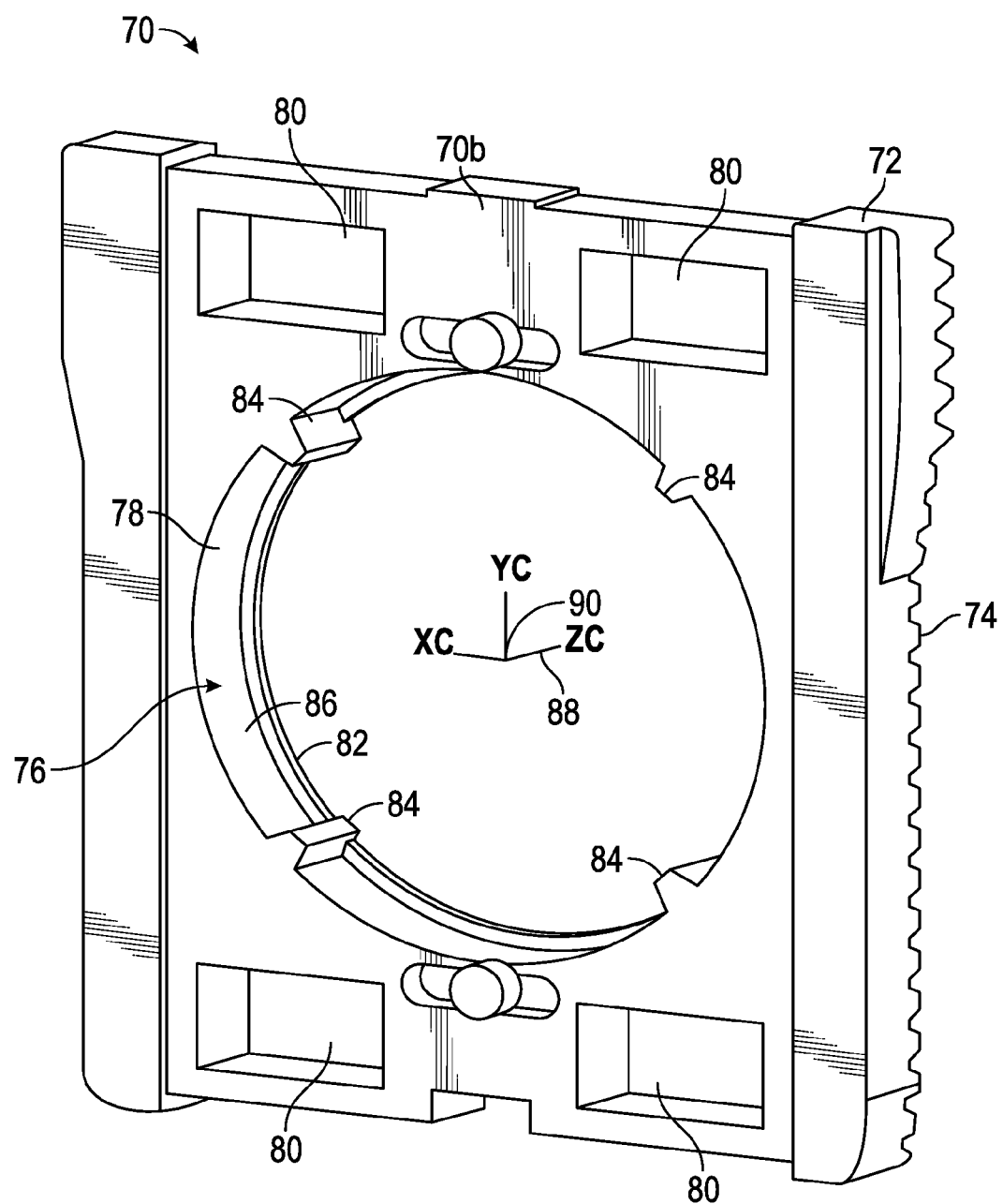
FIG. 2B is a perspective view of the upstream face of the orifice plate carrier of FIG. 1.
Figure 3:
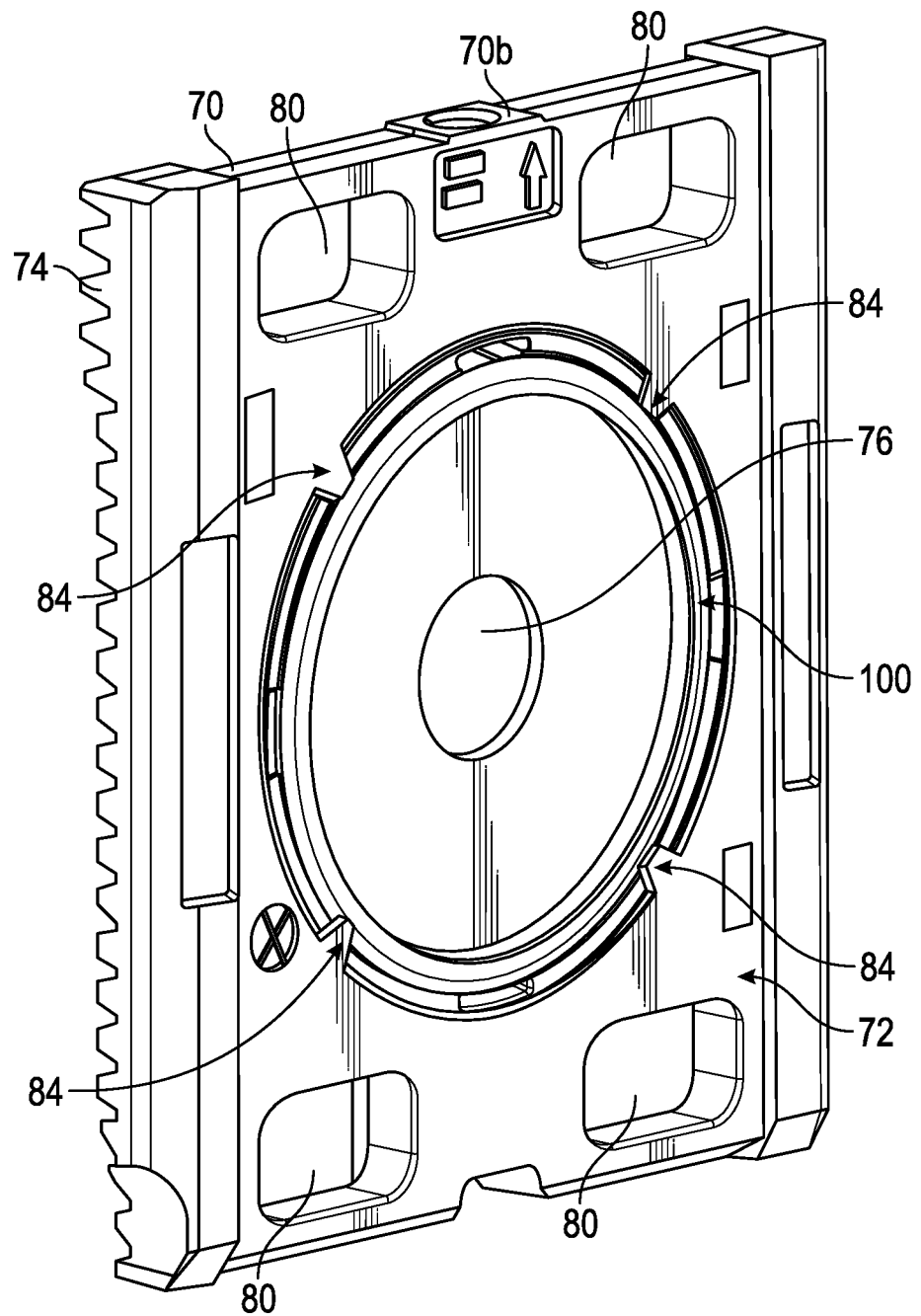
FIG. 3 is a perspective view of the orifice plate assembly of FIG. 1 disposed in the orifice plate carrier of FIGS. 2A and 2B in accordance with principles disclosed herein.

Referring to FIGS. 2A, 2B and 3, flow ports 80 allow fluid flow therethrough when plate carrier 70 is displaced into and out of position within flowbore 62 of fitting 10. In this embodiment, body 72 includes four circumferentially spaced flow ports 80, each having a generally rectangular shape with beveled corners. While body 72 includes four flow ports 80 in this embodiment, there may be fewer or more flow ports 80 in other embodiments. Moreover, flow ports 80 may take other physical shapes and positions within body 72. Downstream face 70a of body 72 includes a retaining lip 82 and a plurality of circumferentially spaced notches 84 radially extending inward from inner surface 78 of central opening 76.

Specifically, retaining lip 82 extends radially inwards from inner surface 78 at downstream face 70a, while notches 84 extend radially inwards from inner surface 78 between downstream face 70a and an upstream face 70b of body 72. In other words, notches 84 extend axially (i.e., with respect to central axis 60) between faces 70a and 70b while retaining lip 82 is disposed at downstream face 70a. Retaining lip 82 and notches 84 are also shown in FIG. 2B, which is a view of the upstream face 70b of plate carrier 70. In some embodiments, including those depicted by FIGS. 2A and 2B, retaining lip 82 and/or notches 84 are integral to body 72. In this embodiment, retaining lip 82 and inner surface 78 bound an axially extending recess 86. Thus, orifice plate assembly 100 may be inserted into the upstream face 70b of body 72 via central opening 76 of plate carrier 70 to seat in recess 86 and abut retaining lip 82, as shown in FIG. 3.

Notches 84 do not extend circumferentially along the full circumference of inner surface 78 of body 72, as does retaining lip 82, but instead are positioned at circumferentially spaced angular positions of 45 degrees, 135 degrees, 225 degrees, and 315 degrees, measured from a horizontal line 88 extending from the center 90 of opening 76. Each notch 84 has a height configured to engage an outer circumferential surface of orifice plate assembly 100, when orifice plate assembly 100 is inserted into plate carrier 70. In at least some embodiments, notches 84 comprise metal, such as stainless steel, to provide metal-to-metal contact between each notch 84 and the orifice plate. Further, while in this embodiment orifice plate assembly 100 is shown received or captured in orifice plate carrier 70, in other embodiments, orifice plate assembly 100 may be received or coupled with other orifice plate carriers or other devices for receiving orifice plate assembly 100.

Figure 4:
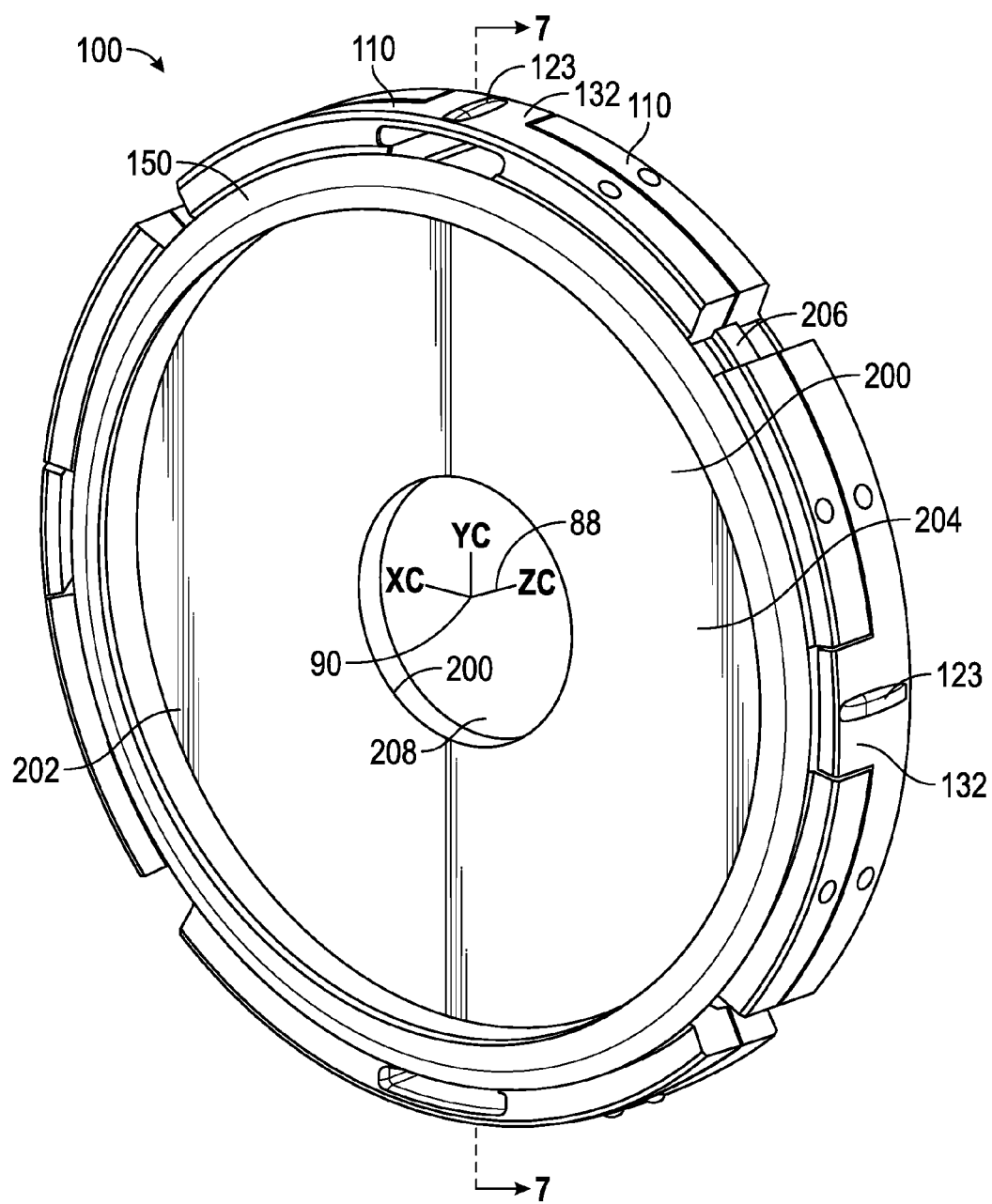
FIG. 4 is a perspective view of the orifice plate assembly of FIG. 1.

Referring to FIG. 4, orifice plate assembly 100 generally includes a pair of identical compression rings 110 configured to capture or receive an orifice plate 200 disposed therebetween. However, in other embodiments an orifice plate assembly may only comprise a pair of compression rings 110 to be assembled with an orifice plate 200 prior to installation in plate carrier 70. Orifice plate 200 is removably disposed between the pair of compression rings 110. In this embodiment, orifice plate 200 is a generally thin or flat disk and includes a generally circular or disk shaped body 202 having front and rear facing surfaces 204, a radially outer cylindrical surface 206, and a centrally disposed aperture 208 extending axially (relative horizontal line 88) therethrough. As will be described further herein, compression rings 110 couple to orifice plate 200 via engagement with a radially outer portion of facing surfaces 204 proximal outer cylindrical surface 206. More specifically, each compression ring 110 includes an annular elastomer seal ring 150 molded thereon for creating an annular seal between each compression ring 110 and a corresponding facing surface 204 of orifice plate 200. In this embodiment, seal ring 150 is formed from a molded elastomer material, such as fluroelsastomer (FKM). In other embodiments, seal ring 150 may comprise other molded elastomeric compounds, such as Hydrogenated Nitrile Butadiene Rubber (HNBR). Moreover, seal rings 150 of compression rings 110 also form an annular seal against seat faces 58 of tubular member 54 to restrict fluid communication between lower chamber 20 and flowbore 62. In this arrangement, the entire fluid flow through flowbore 62 is directed through aperture 208 of orifice plate 200.

Orifice plate 200 is securely held and aligned between compression rings 110 by one or more fasteners or snaps 132 that clamp the outer radial portions of each compression ring 110 to the opposing or mating compression ring 110, thereby holding orifice plate assembly 100 together. Further, each snap 132 holds compression rings 110 and orifice plate 200 together, such that orifice plate assembly 100 may be disposed in plate carrier 70 and installed in orifice fitting 10.

Orifice plate bore 208 is machined from orifice plate 200. Orifice plate bore 208 has a diameter less than the diameter of passage 62 of orifice fitting 10. In this manner, fluid flow from upstream region 66 to downstream region 64 is restricted by the relative small diameter of orifice plate bore 208. As a result, the fluid pressure upstream orifice plate 200 is greater than the fluid pressure downstream of orifice plate 200. Small access pressure ports or pressure taps (not shown) may be provided on each side of orifice plate 200 to permit the measurement of pressure differentials across orifice plate 200. The measured pressure differentials may be then used to calculate fluid flow rate through orifice fitting 10 shown in FIG. 1.

Figure 5A:
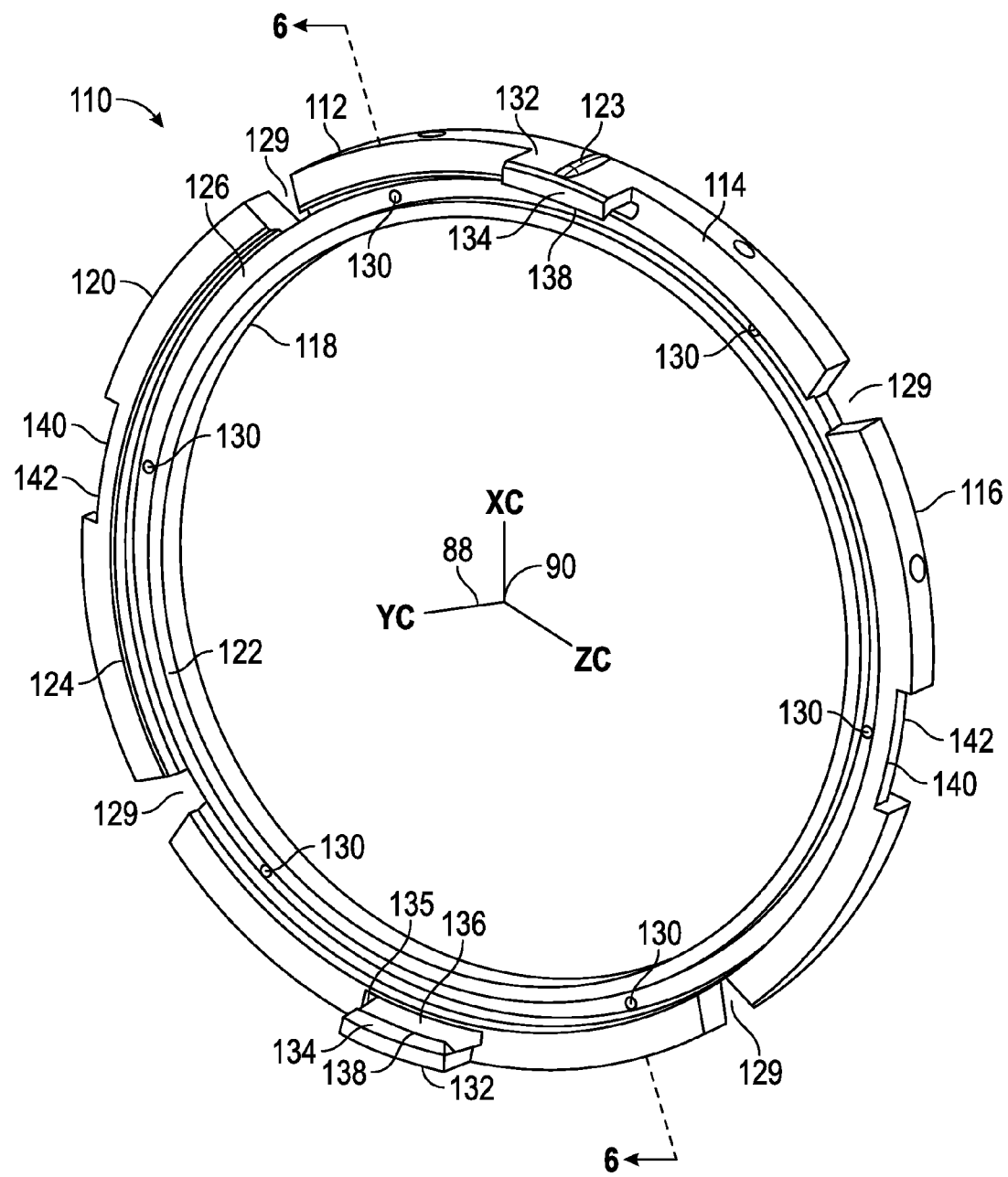
FIG. 5A is a perspective view of an inner face of a compression ring of the orifice plate assembly of FIG. 1 in accordance with principles disclosed herein.
Figure 5B:
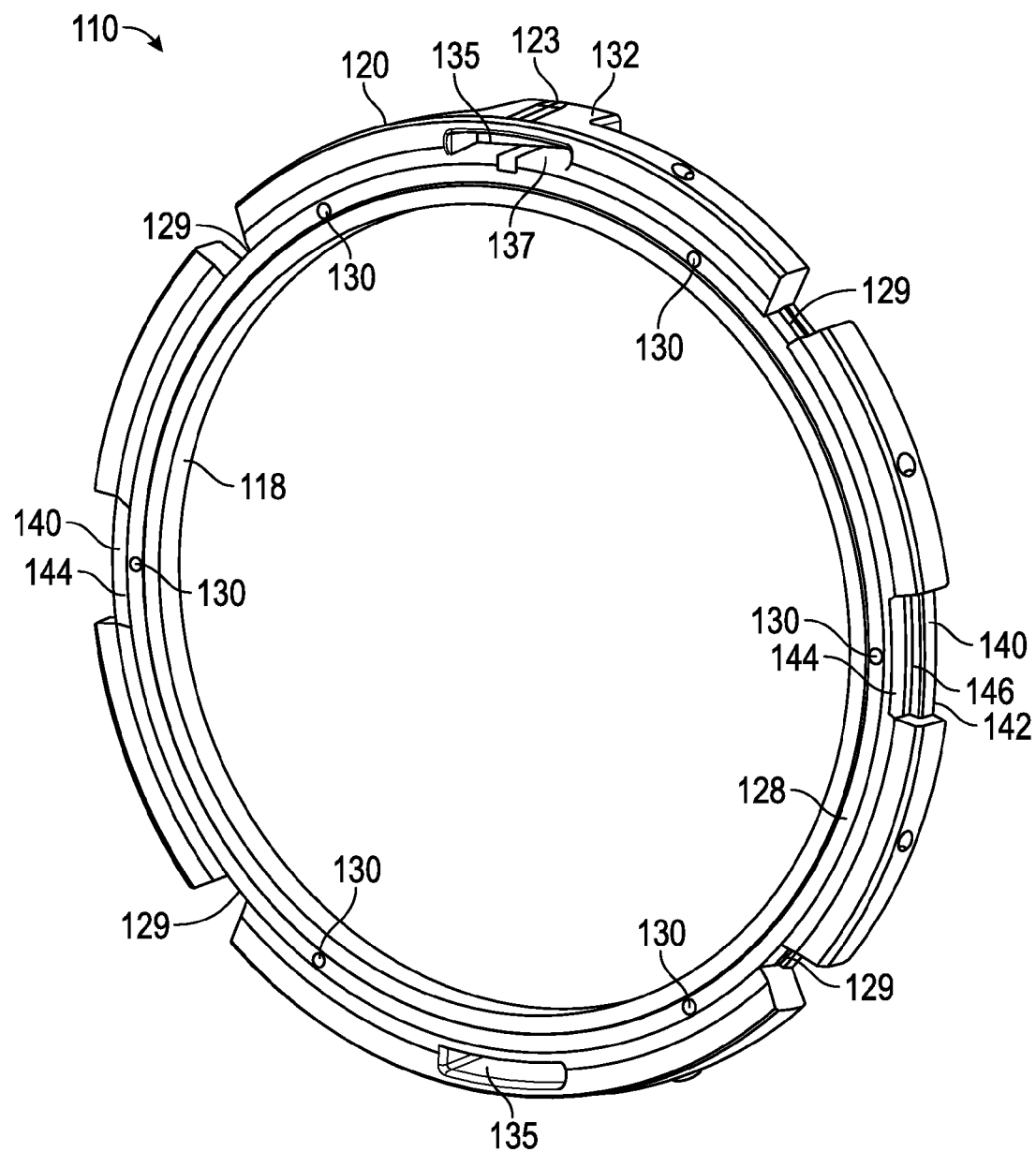
FIG. 5B is a perspective view of an outer face of a compression ring of the orifice plate assembly of FIG. 1 in accordance with principles disclosed herein.
Figure 6:
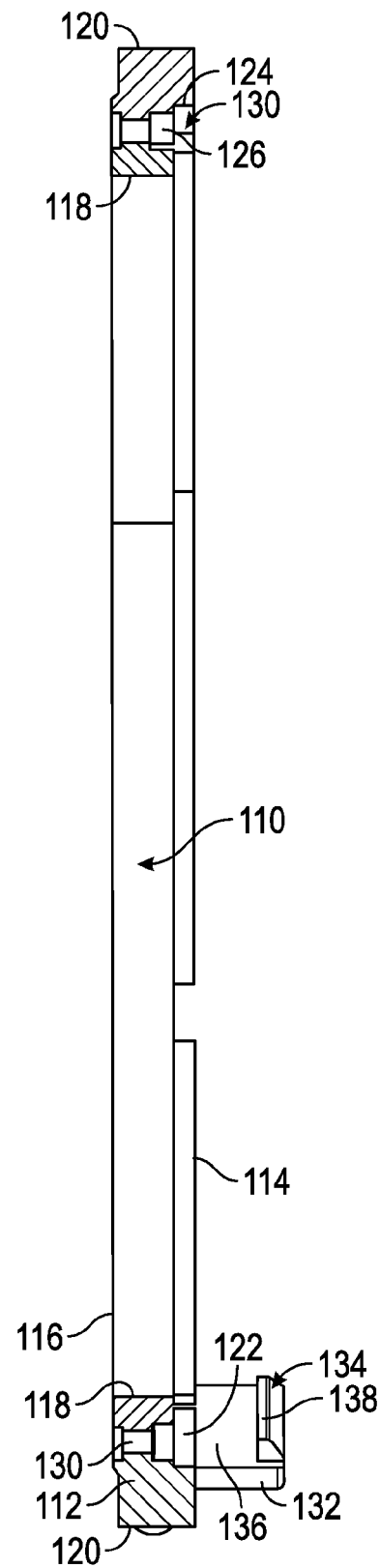
FIG. 6 is a cross-sectional view along lines 6-6 of the compression ring of FIG. 5A.

Referring to FIGS. 5A, 5B, and 6, in this embodiment compression ring 110 generally includes an annular body 112 having an inner facing surface 114, an outer facing surface 116, an inner cylindrical surface 118, and an outer generally cylindrical surface 120. Inner cylindrical surface 118 of body 112 includes a first annular bore or recess 122 that extends axially (relative horizontal line 88) into inner facing surface 114. First annular recess 122 extends radially from inner surface 118, forming an annular shoulder 124 proximal outer surface 120. Inner cylindrical surface 118 further includes an annular counterbore or groove 126 between inner surface 118 and outer surface 120 that extends axially (relative horizontal line 88) into the first annular recess 122. Body 112 also includes an outer annular groove 128 that extends axially into outer facing surface 116. Inner surface groove 126 is substantially radially aligned (i.e., has substantially the same diameter) with outer surface groove 128 and is defined by a pair of annular shoulders 127 (shown in FIG. 7A). Body 112 further includes a plurality of circumferentially spaced injection ports 130 that extend axially between inner surface groove 126 and outer surface groove 128 to provide for fluid communication between grooves 126 and 128. In this embodiment, body 112 includes six injection ports 130 circumferentially spaced approximately 60 degrees apart. However, in other embodiments the body 112 of each compression ring 110 may include a different number of injection ports 130 spaced at different circumferential intervals.

Body 112 also includes a plurality of circumferentially spaced arcuate grooves 129 extending radially into generally cylindrical outer surface 120 and axially between inner facing surface 114 and outer facing surface 116. In this embodiment, compression ring 110 comprises four circumferentially spaced arcuate grooves 129, spaced approximately 90 degrees apart; however, in other embodiments compression ring 110 may comprise varying number of grooves 129, where grooves 129 are not equidistantly spaced. In this embodiment, arcuate grooves 129 extend radially through annular shoulder 124 and into first annular recess 122. Arcuate grooves 129 are configured to allow orifice plate assembly 100 to be inserted into central opening 76 of plate carrier 70. Specifically, arcuate grooves 129 receive notches 84 of plate carrier 70 as orifice plate assembly 100 is inserted into central opening 76, as shown in FIG. 3. The reception of notches 84 in corresponding arcuate grooves 129 disposed orifice plate assembly 100 within orifice fitting 10 such that orifice plate assembly 100 is disposed coaxially with central axis 60 of axial flowbore 62.

Each compression ring 110 includes a pair of circumferentially spaced snaps or arms 132 extending axially (relative horizontal line 88) from inner facing surface 114 for coupling with a pair of circumferentially spaced, arcuate snap engagement segments or recesses 140 that extend radially into outer cylindrical surface 120. In this embodiment, each compression ring 110 includes two snaps 132 spaced approximately 180 degrees apart, and two snap engagement segments 140 spaced approximately 180 degrees apart, where each snap 132 is circumferentially spaced approximately 90 degrees from a snap engagement segment 140; however, in other embodiments compression 110 may include varying numbers of snaps 132 and snap engagement segments 140 circumferentially spaced at varying intervals. Each snap 132 of compression ring 110 is configured to releasably engage or couple with a corresponding snap engagement segment 140 of an opposing or mating compression ring 110. In other words, the two snaps 132 of a first compression ring 110 are received by and couple with two snap engagement segments 140 of a second or opposing compression ring 110. In this manner, two opposing or mating compression rings 110 may couple about a received orifice plate 200 to form orifice plate assembly, as shown in FIG. 4.

In the embodiment shown in FIGS. 5A, 5B, and 6, each snap 132 generally extends axially from inner facing surface 114 and includes a radially extending hook or latch 134 at a terminal end thereof. Further, an arcuate groove 135 circumferentially aligned with snap 132 is formed in compression ring 110 and is defined by an arcuate inner surface 137. Each arcuate snap engagement segment 140 includes a first arcuate groove 142 extending into outer cylindrical surface 120 of body 112 between inner facing surface 114 and outer facing surface 116. Snap engagement segment 140 also includes a second arcuate groove 142 extending into outer cylindrical surface 120 of body 112, and extending axially (relative horizontal line 88) from outer facing surface 116, forming an annular shoulder 146 axially between first groove 142 and second groove 144. In this arrangement, when snap 132 is in the locked position (shown in FIGS. 7A and 7B) an outer surface of first groove 142 is disposed proximal an inner surface 136 of snap 132, and a terminal end 138 of latch 134 is disposed proximal second groove 144.

Referring to FIGS. 5A-7B, in this embodiment, snap 132 is integral with compression ring 110, and latch 134 is integral with snap 132. Also in this embodiment, latch 134, when viewed through its cross-section, generally has the shape of a hook. However, in other embodiments (not specifically illustrated), latch 134 may have any suitable geometry permitting releasable engagement with compression ring 110. In this arrangement, snap 132 is effectively cantilevered from the inner facing surface 114 of compression ring 110. As a result, snap 132 behaves like a resilient spring when flexed relative to compression ring 110. Thus, when snap 132 is flexed in the direction of arrow 139, snap 132 generates a restoring force generally in the direction of arrow 141. This spring-like characteristic of snap 132 aids in maintaining 132 in the "locked position" shown in FIGS. 7A and 7B. A plurality of spring snaps 132 thus are employed to secure together or unlock compression rings 110 and orifice place 200.

In some embodiments, compression rings 110 are injection molded from Polytetrafluoroethylene, otherwise known as polytetrafluoroethylene (PTFE), or other similar material known in the industry. In other embodiments, compression rings 110 may be injected molded from other thermoplastic materials, such as Polyoxymethylene (POM) or Polyether ether ketone (PEEK). The injection molding of compression rings 110 permits reduced manufacturing costs in comparison to levels associated with machining these parts from bar stock. In addition to reduced manufacturing costs, injection molding enables the production of compression rings 110 to within tight design tolerances, thereby reducing the possibility of leakage and/or unintentional disassembly when a plate carrier holding an orifice plate assembly including compression rings 110 is handled when either removing or installing the orifice plate assembly within an orifice fitting. PTFE is particularly suited for exposure to highly corrosive fluids. Moreover, the elastic behavior of PTFE enables snaps 132 to provide a secure locking mechanism for orifice plate assembly 100, even after repeated assembly, disassembly, and reassembly of orifice plate assembly 100.

Figure 7A:
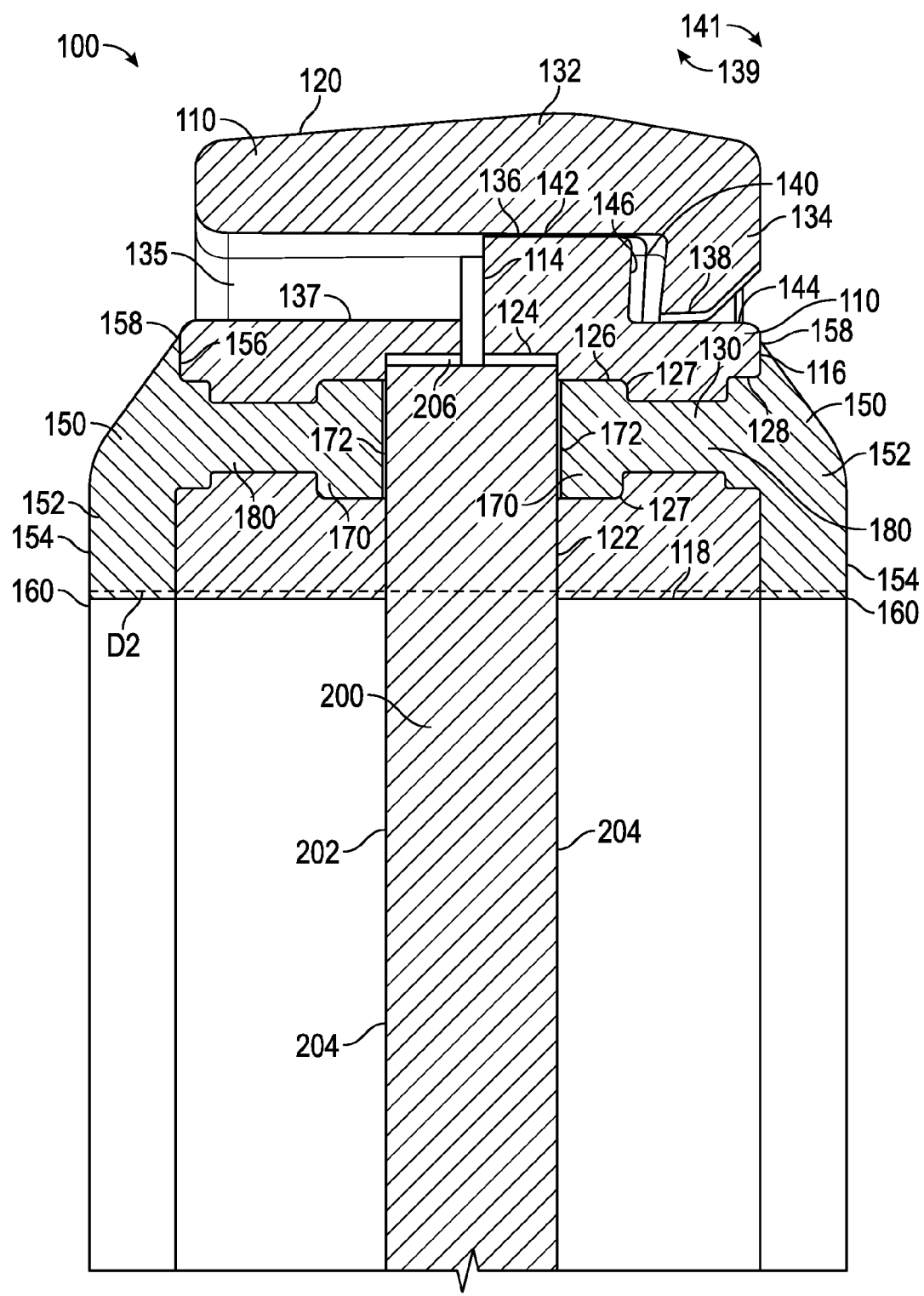
FIG. 7A is a perspective cross-sectional view along lines 7-7 of the orifice plate assembly of FIG. 4.
Figure 7B:
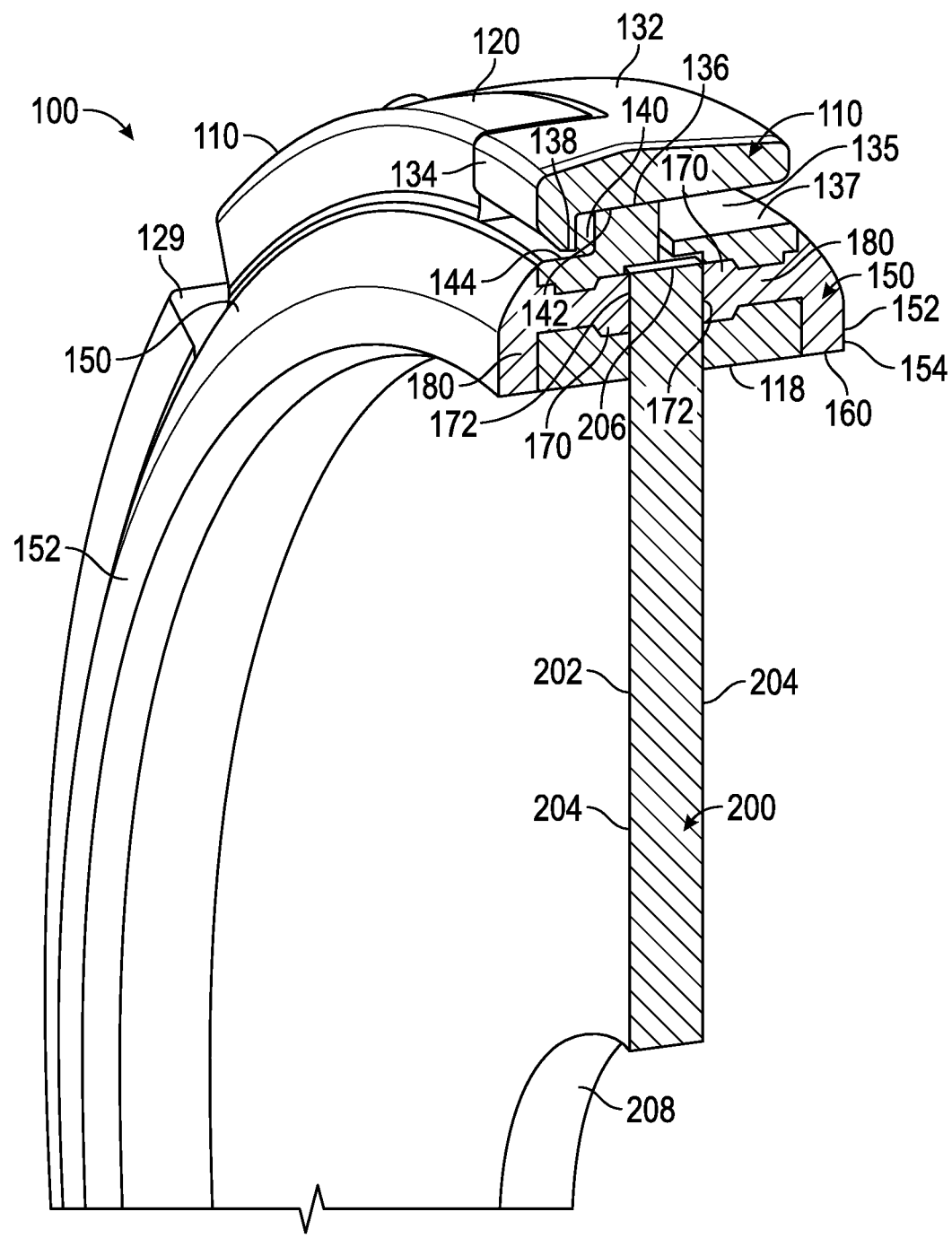
FIG. 7B is a front cross-sectional view along lines 7-7 of the orifice plate assembly of FIG. 4.

In the embodiment shown in FIGS. 7A and 7B, each compression ring 110 includes an annular seal ring 150 molded thereon for sealing against orifice plate 200 and the seat faces 58 of tubular member 54. During the molding process, material forming seal ring 150 may be flowed or injected through injection ports 130 of compression ring 110 to form seal ring 150. Thus, the molding process results in a seal ring 150 molded to compression ring 110 and generally including an outer annular seal 152 and an inner annular seal 170 integrally connected via a plurality of axially (relative horizontal line 88) extending links 180. Outer annular seal 152 generally includes an outer facing surface 154, an inner facing surface 156, a radially outer end 158, and a radially inner end 160. Radially outer end 158 of outer annular seal 152 has a diameter that is similar but slightly less than the diameter of inner surface 137 of arcuate groove 135 and radially inner end 160 has a diameter substantially the same as the diameter of inner surface 118 of compression ring 110.

In this embodiment, inner annular seal 170 is disposed in inner surface groove 126 of body 112 and includes an annular sealing surface 172 for engagement with a facing surface 204 of orifice plate 200. Inner annular seal 170 is captured within inner surface groove 126 via annular shoulders 127. In this arrangement, annular shoulders 127 of inner surface groove 126 may apply a compressive force against inner annular seal 170, and in turn, apply a pressure load between facing surface 204 of orifice plate 200 and annular sealing surface 172 of inner annular seal 170.

As shown in FIGS. 5A-7B, compression rings 110 are identical. In this embodiment, orifice plate assembly 100, including identical first compression rings 110 and accompanying seal rings 150, is bi-directional. A bi-directional orifice plate assembly may be inserted into plate carrier 70 with either compression ring 110 facing upstream, i.e. either of the two compression rings 110 may be adjacent to upstream region 66. Specifically, when the compression ring 110 in contact with plate carrier 70 becomes worn due to abrasions caused by repeated installation and removal from plate carrier 70, the orifice plate assembly 100 may be flipped one-hundred and eighty degrees so that the other compression ring 110 contacts plate carrier 70 instead. Thus, the service life of the bi-directional orifice plate assembly may be extended substantially beyond that of a conventional uni-directional orifice plate assembly. Moreover, such flipping will have no impact to the accuracy of pressure measurements, and therefore, calculated fluid flows.

Orifice plate assembly 100 may be assembled as shown in FIGS. 7A and 7B by disposing orifice plate 200 between first and second uncoupled compression rings 110, and subsequently coupling together compression rings 110 via snaps 132. In this assembled configuration, orifice plate assembly 100 may be successfully installed and removed from orifice fitting 10. Specifically, orifice plate 200 may be radially aligned about horizontal line 88 with respect to the pair of compression rings 110, such that an outer radial edge of orifice plate 200 is disposed within the first annular recess 122 of each compression ring 110, with outer cylindrical surface 206 disposed proximal annular shoulders 124. In this position, the two snaps 132 of the first compression ring 110 may be releasably coupled (such as by hand) or clamped to the corresponding snap engagement segments 140, thereby releasably coupling the first compression ring 110 to the second compression ring 110 with the orifice plate 200 disposed therebetween.

Once orifice plate assembly 100 has been assembled with first and second compression rings 110 releasably coupled together with orifice plate 200 captured therebetween, orifice plate assembly 100 may be inserted into orifice plate carrier 70. When so installed, projections 123, circumferentially spaced along the outer surface of each compression ring 110, enable orifice plate assembly 100 to fit snugly within orifice plate carrier 70, eliminating or restricting movement of orifice plate assembly 100 within plate carrier 70, including rotation of orifice plate assembly 100 about horizontal line 88. Projections 123 extend radially outward from outer surface 120 and may take many forms, including those shapes illustrated in FIG. 6. Also, projections 123 may be uniformly circumferentially distributed along outer surface 120 of compression rings 110 in some embodiments, while not uniformly distributed in others.

Also in the assembled configuration, as shown in FIGS. 7A and 7B, an axially extending gap having a distance D2 (shown in FIG. 7A) is disposed between the outer annular seal 152 of each seal ring 150. The distance D2 between corresponding outer annular seals 152 is greater than the distance D1 between the corresponding annular seat faces 58 of tubular member 54. Thus, when the assembled orifice plate assembly 100 is installed within orifice fitting 10, as shown in FIG. 1, a compressive force may be applied to facing surfaces 204 of orifice plate 200 to create an annular seal between sealing surface 172 of the seal ring 150 of each compressing ring 110 and each facing surface 204 of orifice plate 200.

Specifically, because the distance D2 between outer annular seals 152 of the assembled orifice plate assembly 100 is greater than the distance D1 between annular seat faces 58, the annular seat faces 58 apply a compressive force against outer annular seals 152, which is transferred to the inner annular seal 170 of the corresponding compressive rings 110, causing inner annular seals 170 to physically engage corresponding first and second facing surfaces 204 of orifice plate 200. In response to the physical engagement of inner annular seals 170 against facing surfaces 204 of orifice plate 200, annular shoulders 127 of each inner surface groove 126 also act against inner annular seals 170, thereby compressing the annular sealing surface 172 of each inner annular seal 170 to provide a fluid seal between annular sealing surfaces 172 and the facing surfaces 204 of orifice plate 200. Moreover, engagement between each outer annular seal 152 and corresponding annular seat face 58 creates an annular seal between each outer annular seal 152 and contacting annular seat face 58. In this manner, fluid communication between lower chamber 20 and flowbore 62 is restricted.

While exemplary embodiments have been shown and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. For example, the relative dimensions of various parts, the materials from which the various parts are made, and other parameters can be varied. Furthermore, though the openings in the plate carriers are shown as circles, they may include other shapes such as ovals or squares. Accordingly, it is intended that the following claims be interpreted to embrace all such variations and modifications.

What is claimed is:

1. An orifice plate assembly comprising:
    a plurality of ring members, each having an inner facing surface comprising a first annular recess extending therein; and
    a plurality of inner annular seals, wherein a different inner annular seal of the plurality is overmolded to the first annular recess of each of the plurality of ring members to seal against a facing surface of an orifice plate captured between the plurality of ring members.

2. The orifice plate assembly of claim 1, wherein each ring member comprises a plastic material and each inner annular seal comprises an elastomeric material.

3. The orifice plate assembly of claim 1, wherein each ring member comprises an outer facing surface having a second annular recess extending therein, and an outer annular seal overmolded to the second annular recess.

4. The orifice plate assembly of claim 3, wherein each ring member comprises a plurality of circumferentially spaced ports extending between the first annular recess and the second annular recess.

5. The orifice plate assembly of claim 4, further comprising an elastomeric element disposed in each port coupling the inner annular seal to the outer annular seal.

6. The orifice plate assembly of claim 5, wherein the inner annular seal, outer annular seal, and each elastomeric element disposed in each port of each ring member is overmolded to a ring member.

7. The orifice plate assembly of claim 1, wherein the first annular recess of each ring member comprises a pair of opposing annular shoulders for compressing the inner annular seal against a facing surface of the orifice plate captured between the plurality of ring members.

8. The orifice plate assembly of claim 1, wherein coupling a first of the plurality of ring members to a second of the plurality of ring members with an orifice plate disposed therebetween compresses the inner annular seal of the ring members against facing surfaces of the orifice plate.

9. An orifice plate assembly comprising:
    a plurality of ring members, each including an outer facing surface and an inner facing surface, wherein the outer facing surface comprises a first annular recess extending therein, the inner facing surface comprises a second annular recess extending therein, and each of the ring members comprises a plurality of ports extending between the first annular recess and the second annular recess; and
    a plurality of seal rings, each of the plurality being molded to one of the plurality of ring members, wherein each seal ring comprises an inner annular seal to seal against a facing surface of an orifice plate captured between the plurality of ring members.

10. The orifice plate assembly of claim 9, wherein each seal ring is overmolded to each ring member.

11. The orifice plate assembly of claim 9, wherein each ring member comprises a plastic material and each seal ring comprises an elastomeric material.

12. The orifice plate assembly of claim 9, wherein the seal ring comprises an outer annular seal disposed in the second annular recess of each ring member.

13. The orifice plate assembly of claim 12, wherein each seal ring comprises an elastomeric element extending through a port of each ring member.

14. The orifice plate assembly of claim 9, wherein the first annular recess of each ring member comprises a pair of opposing annular shoulders for compressing the inner annular seal against a facing surface of the orifice plate captured between the plurality of ring members.

15. The orifice plate assembly of claim 9, wherein coupling a first of the plurality of ring members to a second of the plurality of ring members with an orifice plate disposed therebetween compresses the inner annular seal of the ring members against facing surfaces of the orifice plate.

16. An orifice fitting comprising:
a tubular body having a through passage; and
an orifice plate assembly removably disposed within the tubular body across the through passage, the orifice plate assembly comprising:
an orifice plate disposed between a pair of ring members;
wherein each ring member comprises an inner facing surface comprising a first annular recess extending therein; and
wherein each ring member comprises an inner annular seal overmolded to the first annular recess of the ring member to seal against a facing surface of the orifice plate.

17. The orifice fitting of claim 16, wherein each ring member comprises an outer facing surface having a second annular recess extending therein, and an outer annular seal overmolded to the second annular recess.

18. The orifice fitting of claim 17, wherein each ring member comprises a plurality of circumferentially spaced ports extending between the first annular recess and the second annular recess.

19. The orifice fitting of claim 16, further comprising an elastomeric element disposed in each port coupling the inner annular seal to the outer annular seal.

20. The orifice fitting of claim 16, wherein each ring member comprises an outer annular seal, and wherein a distance between the outer annular seals of the orifice plate assembly is greater than the distance between a pair of annular seat faces of the tubular body.

* * * * *